United States Patent
Zakriti

(10) Patent No.: US 8,040,215 B2
(45) Date of Patent: Oct. 18, 2011

(54) ADDRESS SELECTION FOR AN I2C BUS

(75) Inventor: Abdelouahid Zakriti, Rabat (MA)

(73) Assignee: STMicroelectronics Maroc, Casablanca (MA)

( * ) Notice: Subject to any disclaimer, the term of this patent is extended or adjusted under 35 U.S.C. 154(b) by 1560 days.

(21) Appl. No.: 11/432,773

(22) Filed: May 11, 2006

(65) Prior Publication Data

US 2006/0282592 A1    Dec. 14, 2006

(30) Foreign Application Priority Data

May 11, 2005   (FR) ...................... 05 51218

(51) Int. Cl.
*H04L 7/00*    (2006.01)
*G05B 23/02*   (2006.01)

(52) U.S. Cl. ........ 340/4.21; 340/4.37; 340/3.5; 340/3.1; 710/300

(58) Field of Classification Search ............. 340/825.21, 340/825.25, 310.12, 3.5, 2.26, 3.1, 3.54, 340/4.21, 4.3–4.4; 710/1–4, 104; 703/25, 703/27; 348/705, 706
See application file for complete search history.

(56) References Cited

U.S. PATENT DOCUMENTS

| | | | |
|---|---|---|---|
| 5,592,633 A | 1/1997 | Casis et al. | |
| 5,689,196 A * | 11/1997 | Schutte | 326/86 |
| 6,097,208 A | 8/2000 | Okajima et al. | |
| 6,622,188 B1 * | 9/2003 | Goodwin et al. | 710/105 |
| 6,745,270 B1 * | 6/2004 | Barenys et al. | 710/104 |
| 7,092,041 B2 * | 8/2006 | Lendaro | 348/705 |
| 7,386,635 B2 * | 6/2008 | Hsu | 710/3 |
| 2005/0097230 A1 | 5/2005 | Hsu | |

OTHER PUBLICATIONS

French Search Report from French Patent Application 05/51218, filed May 11, 2005.

* cited by examiner

*Primary Examiner* — Nam V Nguyen
(74) *Attorney, Agent, or Firm* — Lisa K. Jorgenson; William R. McClellan; Wolf, Greenfield & Sacks, P.C.

(57) ABSTRACT

An address configuration circuit and a method for sharing a series bus connected to a first device between two secondary devices by a configuration within each secondary device of a different address, including, in a configuration phase, the temporary configuring of an output terminal of each secondary device in a mode of reading of the voltage present on this terminal to select one address out of two within the device.

21 Claims, 2 Drawing Sheets

ADDRESS SELECTION FOR AN I2C BUS

BACKGROUND OF THE INVENTION

1. Field of the Invention

The present invention generally relates to devices communicating via a series bus. The present invention more specifically applies to an I2C bus which uses two respective clock and data bi-directional conductors, the exchanges of which are standardized.

The present invention more specifically relates to the connection of several identical (peripheral) devices on a same series bus to communicate with a central element (for example, a microcontroller).

The present invention more specifically applies to miniaturized systems, for example, cell phones or laptop computers.

2. Discussion of the Related Art

I2C buses are generally used between a master or host circuit and one or several slave or peripheral devices having functions called by the master device.

Due to the twin-wire structure of the I2C bus, the sharing of a same bus, that is, of two conductors connected to two input/output terminals of the master device by several peripherals, is a problem. The peripherals are indeed addressed via the data signal by insertion at the beginning of each frame of the address of the peripheral which is intended to receive the message.

A first known solution is to dedicate a bus to each device. This solution has the disadvantage of requiring multiple terminals on the host device.

A second known solution is to dedicate a specific fixed address to each peripheral, so that it can be selected by the host device. A disadvantage of such a solution is that it precludes any versatility in the peripherals.

A third known solution is to interpose a multiplexer between the host device and the peripherals to allow a sharing of two input/output terminals of the host device by several peripherals connected to individual buses up to the multiplexer. The addition of such a multiplexer becomes more expensive as the number of devices to be shared increases.

A fourth known solution is to provide, at the level of each peripheral, address selection terminals enabling it, by a connection of these terminals to a high or low supply level, to configure its address in a way that can be recognized afterwards by the host device. A disadvantage of this solution is that this requires, on the peripheral side, dedicated address selection terminals. Such a solution is in particular unavailable on low-cost integrated circuits.

A fifth known solution is to provide, on the host device side, a default address to control an address programming on the peripheral side. However, to avoid that two peripherals connected to the bus receive the same configuration instructions, it is necessary to add a separated logic circuit to deactivate (for example, by cutting off its power supply) one of the peripherals while the other one is being configured.

SUMMARY OF THE INVENTION

The present invention aims at overcoming all or part of the disadvantages of known solutions to share a same series bus between a host device and two peripherals.

The present invention more specifically aims at avoiding the addition of external logic devices to the host device and to the peripherals.

The present invention also aims at avoiding use of an external multiplexer.

The present invention also aims at avoiding use of additional access terminals, be it on the host device side or on the peripheral side.

The present invention also aims at a solution particularly well adapted to I2C buses.

To achieve all or part of these objects, as well as others, the present invention provides a method for sharing a series bus connected to a first device between two secondary devices by a configuration within each secondary device of a different address, comprising, in a configuration phase, the temporary configuring of an output terminal of each secondary device in a mode of reading of the voltage present on this terminal to select one address out of two within this device.

According to an embodiment of the present invention, a first default address is selected if, in the configuration phase, the voltage present on said terminal is lower than a given threshold, the second address being selected if said voltage becomes higher than said threshold during the configuration phase.

According to an embodiment of the present invention, the respective output terminals of the secondary devices are connected to a low or high voltage by a resistor of high value, according to the address that they must select.

According to an embodiment of the present invention, the configuration phase starts, in each secondary device, on receiving of an instruction sent with the first address by the first device.

According to an embodiment of the present invention, the taking into account of the state present on said terminal of each secondary device occurs at the end of a delay which follows the starting of the configuration phase.

According to an embodiment of the present invention, the method is applied to an I2C bus.

The present invention also provides a circuit for configuring the address of a device connectable to a series bus, comprising means for temporarily configuring an output terminal of the device as an input terminal having its state compared with a threshold, and means for exploiting the result of this comparison to select one address out of two for the concerned device.

According to an embodiment of the present invention, the circuit comprises at least one first time counter to delay, by a first time period, the taking into account of said comparison with respect to a start time of a configuration phase.

According to an embodiment of the present invention, the first counter triggers the end of the configuration phase at the end of twice the first time period.

According to an embodiment of the present invention, a second counter validates the result of said comparison if this result is in a same state for a second time period longer than half the first one.

According to an embodiment of the present invention, the duration of the configuration phase is shorter than the duration of transmission of a byte over the series bus.

According to an embodiment of the present invention, the configuration phase is triggered by the receiving of an instruction over the series bus.

According to an embodiment of the present invention, the series bus is an I2C bus.

The present invention also provides a system for sharing the same series bus connecting a first device to two secondary devices, each secondary device having an output terminal respectively connected to a low or to a high supply voltage by a resistor, and comprising an address configuration circuit.

The foregoing and other objects, features, and advantages of the present invention will be discussed in detail in the

DETAILED DESCRIPTION

Figure 1:
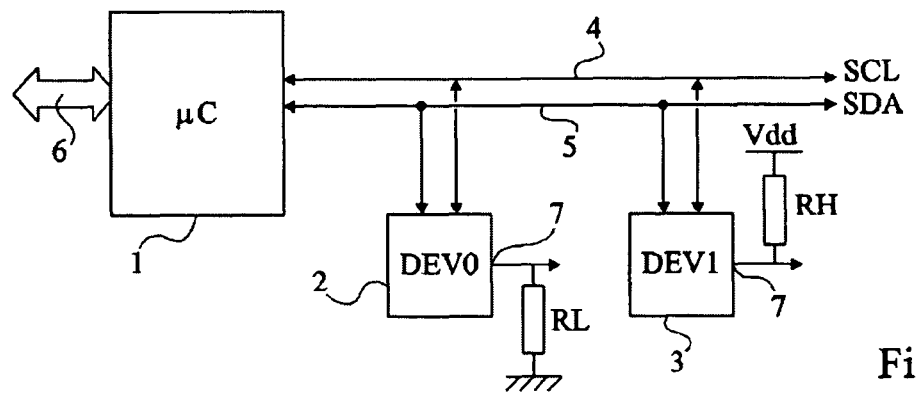
FIG. 1 schematically shows in the form of blocks an embodiment of a system according to the present invention.

The same elements have been designated with the same reference numerals in the different drawings which have been drawn out of scale. For clarity, only those elements and steps which are useful to the understanding of the present invention have been shown in the drawings and will be described hereafter. In particular, the destination of the host device and of its peripherals has not been described in detail, the present invention being compatible with any conventional host device and any conventional peripheral operating an I2C bus. Further, the functions implemented by these devices have not been discussed in detail, the present invention being here again compatible with any conventional functionality of devices sharing an I2C bus.

The present invention will be described hereafter in relation with an example of application to a host device of microcontroller type and to two identical peripherals. It however more generally applies whatever the type of host device, provided that said device manages a series bus and whatever the peripheral device, possibly also formed of a microcontroller.

FIG. 1 very schematically shows in the form of blocks an example of architecture of a system according to an embodiment of the present invention.

A microcontroller 1 forming in this example a master or host device of the system is connected, by a bus I2C, to two slave or peripheral devices 2 (DEV0) and 3 (DEV1). Bus I2C is formed of two respective of clock (SCL) and data (SDA) conductors 4 and 5. Further, microcontroller 1 communicates over one or several bus(es) 6 with other elements, not shown, of the system, be it other peripherals or other microcontrollers. The same holds true for peripherals 2 and 3 that can communicate with other elements, not shown, over different connections.

A feature of an embodiment of the present invention is to use an existing terminal 7 of the peripheral devices to configure their respective addresses from among two possible addresses.

According to this embodiment of the present invention, a terminal 7 which, in normal operation, is an output terminal of device 2 or 3, is used. As illustrated in FIG. 1, a first device 2 (DEV0) has its terminal 7 connected to a reference voltage (for example, the ground) by a resistor RL while the second device 3 (DEV1) has its same terminal 7 connected to a more positive voltage Vdd by a resistor RH. Preferably, resistors RH and RL have significant values (several hundreds of kohms, typically one or a few megaohms).

According to an embodiment of the present invention, each device 2 or 3 comprises logic elements to configure its terminal 7 as an input terminal when a parameterizing of the address is necessary. By then testing the level present on this terminal 7, the device can configure its internal circuits so that they respond to a given address selected from among two possible addresses that it contains. Once the device has been configured, terminal 7 is reconfigured as an output terminal for the normal circuit operation. Since the address parameterizing typically occurs on starting of the system or on each initialization, these are periods when the peripheral circuit does not need its output terminal 7 for other uses, the normal operation being not established yet.

The additional load brought by resistor RH or RL is negligible for the operation of this output terminal, provided that the value of the resistor is sufficiently high. For example, for a supply voltage Vdd of 1.8 volts and a resistor RH or RL of one megaohm, the load is of 1.8 microamperes. Further, if the normal output state of the concerned terminal is the same as that set by the output resistor, no additional current will be consumed. Only in an inverse state can this slight 1.8-microampere current generate a perfectly acceptable low additional power consumption.

Figure 2:
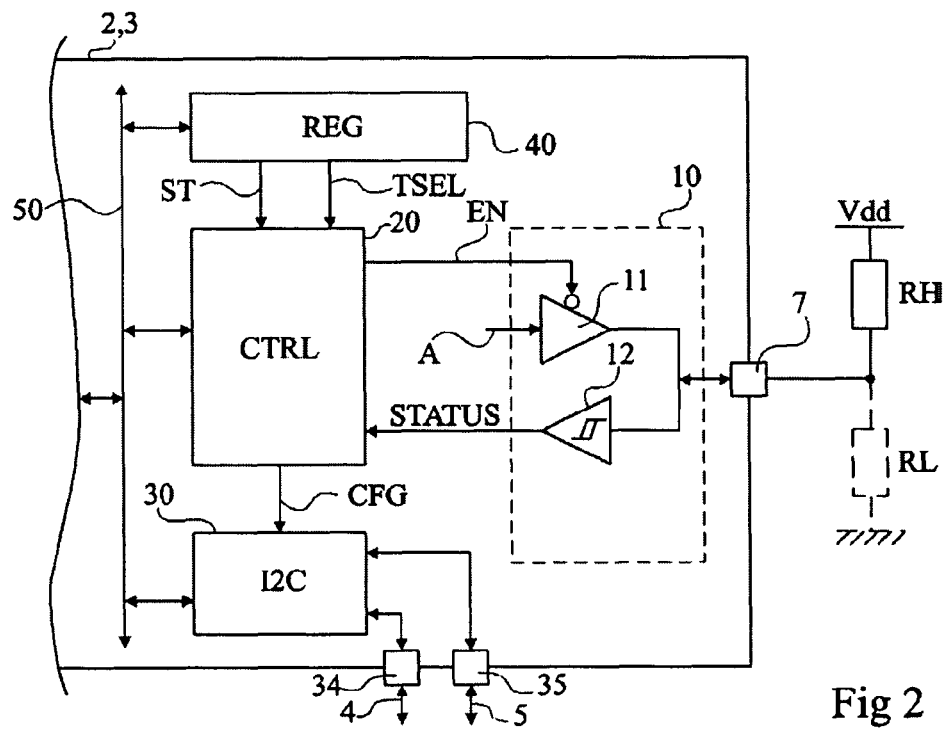
FIG. 2 schematically shows in the form of blocks an embodiment of a peripheral device according to the present invention.

FIG. 2 shows an embodiment of elements internal to peripheral devices 2 and 3 for purposes of configuration of their respective addresses.

According to this embodiment, terminal 7 of each device 2 or 3 is connected to a configuration circuit 10 comprising an amplifier 11 with three states (high, low, and high-impedance) having its output connected to terminal 7. Amplifier 11 is intended to receive an output signal A (low or high) in normal operation and to be placed in a high-impedance state under control of a signal EN when circuit 10 must be configured, so that terminal 7 operates as an input terminal only. Terminal 7 is also connected to the input of a shaping element 12 (for example, a trigger) acting as a threshold comparator having the function of detecting, during the address configuration phase, the possible presence of a resistor RH. The output of comparator 12 is connected to a control element CTRL 20 which also provides signal EN.

Circuit 20 sends to an interface circuit 30 I2C an address configuration signal CFG and, if need be, communicates with the rest of device 2 or 3, for example, over one or several address, data, and control buses 50. Circuit 30 is connected on the one hand to internal buses 50 and on the other hand to terminals 34 and 35 intended to be connected to conductors 4 and 5 of external bus I2C.

According to a first embodiment of the present invention, on each resetting or turning-on of peripheral device 2 or 3, its circuit 20 configures circuit 10 so that terminal 7 is in input operation (in this example, signal EN in the high state), and reads the information present on this terminal. If a resistor RH connected to voltage Vdd is present, output signal STATUS of comparator 12 is at state 1. If a grounded resistor RL is present, output signal STATUS is at state 0.

According to the state of signal STATUS, circuit 20 configures the address of the peripheral as being one of the two possible addresses. This address is stored by circuit 20 which, after, will communicate it to circuit 30 so that the peripheral considers the messages originating from microcontroller 1 with this address as being intended for it.

According to a variation of this embodiment, both devices are by default configured with a first address and, before starting a communication over bus I2C, the microcontroller sends a specific control signal over this bus with this first address. Since the two devices are waiting for a control signal, they are in a mode of reading from bus I2C and there is accordingly no conflict on the bus. Both devices 2 and 3 receive the same control signal. This control signal causes the configuration of the respective circuits 10 in read mode to detect the state of their terminal 7. Here again, each device does this independently without for the other one to be affected by this. Once this reading has been performed, each circuit 20 attaches to its circuit 30 the address of the device from among the two possible addresses. The two devices can then be addressed independently from each other by the microcontroller. The advantage of this embodiment is that it avoids that instabilities of the supply lines on system powering-on result in errors in the detection of the state present on terminal 7.

According to a preferred embodiment of the present invention, the reading of the state present on terminal 7 is delayed with respect to the beginning of the configuration phase, to avoid detection errors which would be likely to occur due to the settling time of the voltage on terminal 7 under the effect of the input capacitances of the assembly (especially of comparator 12).

Figure 3:
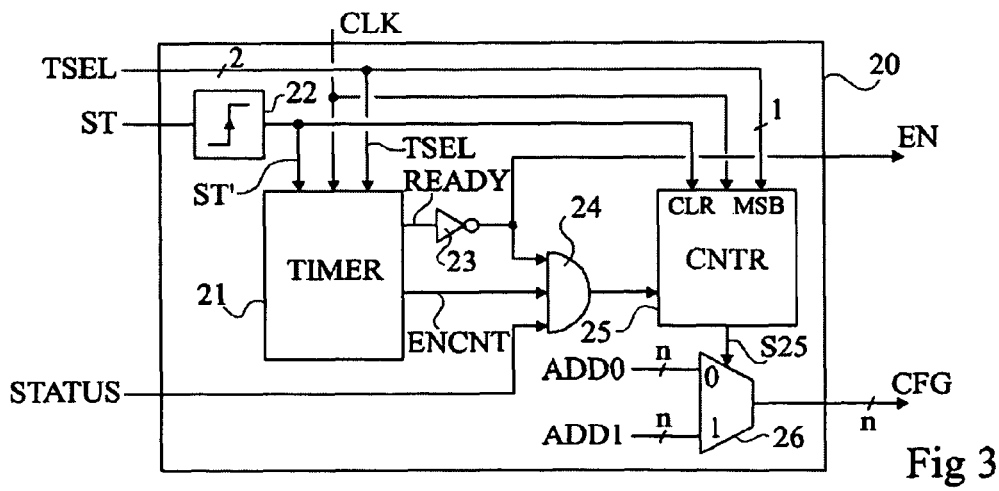
FIG. 3 schematically shows, in the form of blocks, a detail of an address selection circuit of a peripheral device according to a preferred embodiment of the present invention.

FIG. 3 very schematically shows in the form of blocks an embodiment of circuit 20 of FIG. 2 according to this preferred embodiment. Circuit 20 comprises a cycle counter 21 (TIMER) of a clock signal CLK, which is triggered by a pulse of an activation signal ST'. Preferably, the count period is programmable by a binary word TSEL provided, for example, by a register 40 (REG) shown in FIG. 2. Preferably, signal ST' is a pulse signal generated, for example, by a circuit 22 generating a pulse on each switching to the high level of a signal ST provided, for example, by register 40.

Two outputs of counter 21 are used and selected, preferably, to correspond to outputs switching state respectively at the end of the full period (signal READY) set by signal TSEL and at the half-period (ENCNT) of this counting. In the selected example, signal READY is sent, after passing through an inverter 23, onto a first input of a logic AND-type gate 24 having a second input receiving signal ENCNT and having a third input receiving signal STATUS of comparator 12 (FIG. 2). Further, the output of inverter 23 defines configuration signal EN of circuit 10. The use of one or several inverters depends on the active states of the respective signals and is adaptable to different practical cases. The output of AND gate 24 is sent to a high state counter 25, in charge of controlling a multiplexer 26 for selecting from among two addresses ADD0 and ADD1 according to the state 0 or 1 of the bit S25 that it provides at the end of the counting. The output of multiplexer 26 provides configuration address CFG to circuit 30. Counter 25 further receives clock signal CLK, configuration start pulse ST' on a reset terminal CLR, and counting threshold detection signal TSEL, from which it only takes, preferably, a small number of most significant bits MSB so that its threshold is lower than half (preferably, equal to the quarter of) the counting threshold of counter 21.

The function of counter 25 is to check that after the settling time of signal STATUS set by counter 21, the state of this signal is stable to avoid a configuration error due to a transient disturbance. This operation will be better understood in relation with FIG. 4.

Period selection signal TSEL is over a number of bits depending on the number of count periods desired for counter 21. For example, a signal over two bits is enough to set four count periods. As a variation, signal TSEL contains the actual count period.

All the other signals, except for addresses ADD0 and ADD1 (and thus signal CFG) which are over a number n of bits depending on the system, are over a single bit. As a variation, addresses ADD0 and ADD1 are contained in I2C interface circuit 30 and signal CFG is a signal over one bit indicative of the address to be selected.

Figure 4:
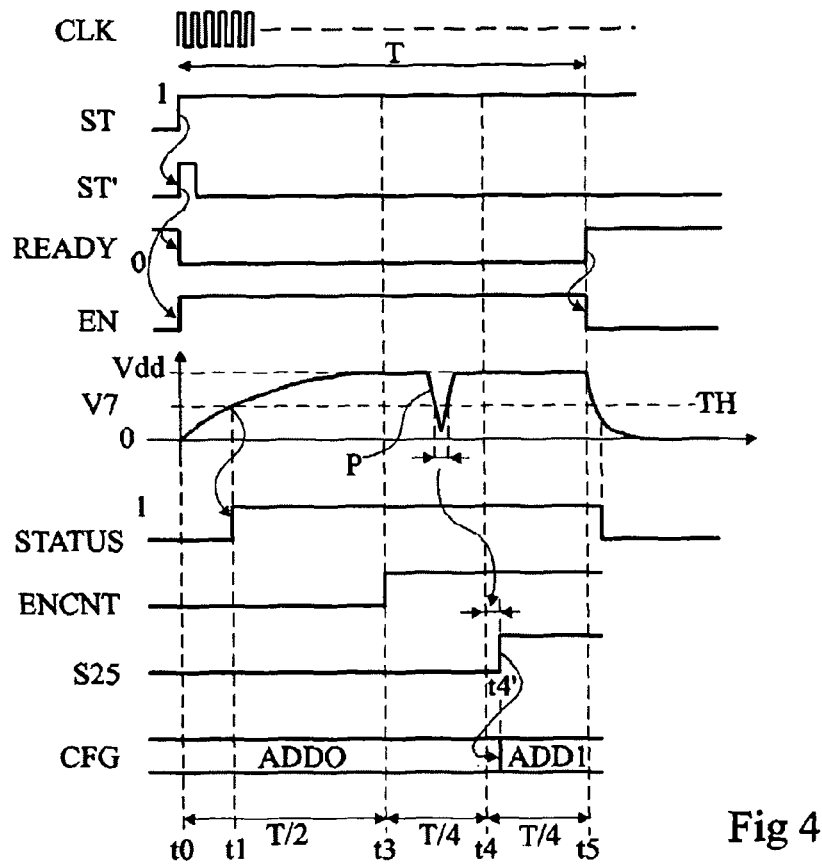
FIG. 4 illustrates, in timing diagrams, a preferred embodiment of the address selection method according to the present invention.

FIG. 4 illustrates, in timing diagrams, an example of embodiment of the circuit of FIG. 3.

At a time t0 corresponding, for example, to the system powering-on, but preferably to the interpretation of a specific instruction originating from microcontroller 1 as being an address configuration instruction, signal ST switches to state 1. In the following description, it is assumed that state 1 is an active state and that state 0 is an inactive state.

The switching to state 1 of signal ST processed by edge shaping circuit 22 provides a signal ST' in the form of a clock pulse from time t0 and over a short time period. (for example, a period of clock CLK) as compared to period T set by counter 21. The setting of counter 21 causes the switching to state 0 of signal READY. The setting of counter 25 forces to zero signal S25 since the output of gate 24 is low (at least output ENCNT of end-of count of counter 21). The switching to state 0 of signal READY also causes the switching to state 1 of signal EN, thus configuring circuit 10 of output terminal 7 in read mode.

It is assumed that a resistor RH connects terminal 7 to positive voltage Vdd. Voltage V7 of terminal 7 thus starts increasing from time t0 from the ground under the effect of a capacitive load of the input impedance of comparator 12. At a time t1 when voltage V7 exceeds threshold TH set by comparator 12 (half the supply voltage in the case of a Schmitt trigger), signal STATUS switches to state 1. Voltage W starts increasing to reach the high level, for example, supply voltage Vdd.

At the end (time t3) of half-period T/2 of count period TSEL of counter 21, signal ENCNT switches to state 1. From time t3, the three inputs of gate 24 are at state 1, which causes the starting of the counting of high states by counter 25. In the absence of a disturbance from time t3 (signal STATUS stable at state 1), signal S25 switches to state 1 to a time t4 corresponding to the time when counter 25 reaches a count equal to half (T/4) the half-period, set by signal MSB. In the presence of a disturbance p between times t3 and t4 resulting in transiently switching the output of gate 24 to the low state, the count of counter 25 is reached at a time t4' only, delayed by the duration of this disturbance. In the shown example, signal CFG which would initially contain address ADD0 contains address ADD1 from time t4'.

At the end (time t5) of count period T of counter 21, signal READY switches high, which, on the one hand, forces the output of gate 24 to the low state and, on the other hand, activates three-state amplifier 11 with signal EN. The state of signal STATUS is no longer taken into account and the address remains configured until the next setting.

In the case of a terminal 7 pulled to ground by a resistor RL, counter 25 does not reach, at time t5, the count set by its input MSB, even in case of transient disturbances making it temporarily cross threshold TH. Accordingly, the selected address remains ADD0.

In the case of a terminal 7 in the air (use of a single peripheral), it can be considered that said terminal is not likely to be charged to a level greater than threshold TH for a period of T/4. According to a preferred variation, no address configuration instruction sent by the microcontroller is used, the address by default being address ADD0.

Figure 5:
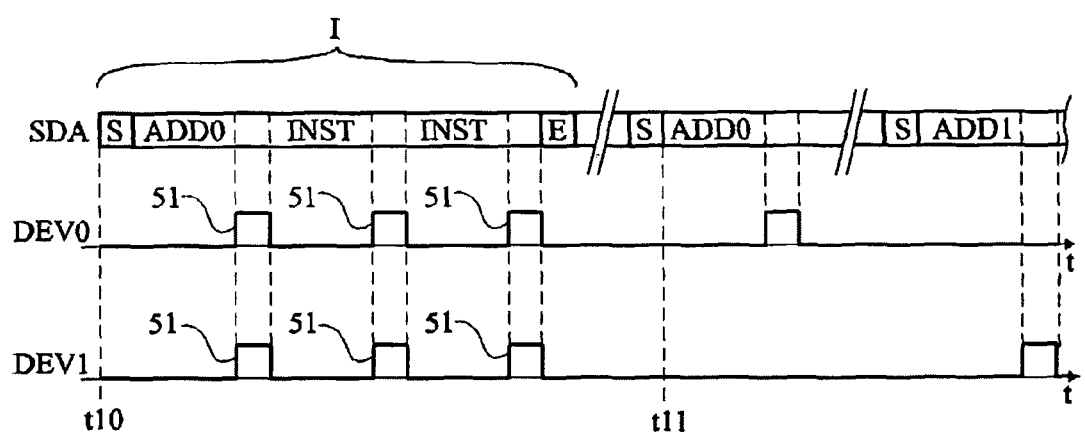
FIG. 5 illustrates, in the form of timing diagrams, the operation of a system for sharing an I2C bus with two peripherals according to an embodiment of the present invention.

FIG. 5 illustrates, in timing diagrams, an operation sequence of the system such as shown in FIG. 1. A first line shows the signals sent by microcontroller 1 on line 5 (SDA) of the I2C bus. A second line illustrates the operation of first device DEV0 having its terminal 7 grounded by resistor RL. A third line illustrates the operation of device DEV1 having its output terminal 7 connected to voltage Vdd by resistor RH.

According to this embodiment, microcontroller 1 starts (time t10) sending a configuration instruction frame I. This message starts with a start bit S followed by address ADD0 initially common to the two peripherals, then by a specific instruction INST to activate control circuit 20. According to cases, several instructions may follow, for example, to configure the count periods to be stored in registers 40. The two peripherals being initially configured with address ADD0, they both receive this first frame and are thus configured at the same time. This reception is symbolized by activity periods 51 on the timing diagrams of FIG. 5. Once the first frame is over (after an end-of-frame bit E), based on the interpretation (last state 51) by devices DEV0 and DEV1 of the address configuration instruction, circuits 20 are activated (signal ST) and the process illustrated in relation with FIG. 4 starts. This process is over at the end of period T which is, preferably, selected to be shorter than the duration of transfer of a byte over the I2C bus. Selecting a period T shorter than the transmission time of a byte guarantees that devices DEV0 and DEV1 are configured even if the microcontroller does not wait between two frames, inasmuch as an address transmitted in a second frame will only be received by the devices at the end of a byte. Possibly, microcontroller 1 sets to the wait mode for a determined time period, selected to be greater than period T.

The configuration phase ends at a time t11 when device DEV1 is then configured with address ADD1, device DEV0 remaining with address ADD0. The microcontroller may also individually address devices 0 or 1 according to the address ADD0 or ADD1 that it transmits.

Of course, this operation requires for the actual microcontroller to know which device it wants to address. This is generally not a problem since the microcontroller programmer sets this address parameter within the latter once it knows the devices connected on the I2C bus and whether they are or not associated with a resistor for setting to state 1 or for setting to state 0.

An advantage of the present invention is that it enables, without using additional terminals, configuring a peripheral device with one address selected out of two.

Another advantage of the present invention is that it requires an external resistor only, for example, on the printed circuit board supporting the peripheral integrated circuits, to configure the different devices.

Another advantage of the present invention is that no modification to a manufactured device is required if it needs to operate alone on a series bus, for example, of I2C type. The operation in the absence of a resistor corresponds to the operation with the address by default. This is an additional advantage over the use of a dedicated terminal to configure the address of the devices where an external resistor is always necessary.

Another advantage of the present invention is that its implementation is simple, be it on the microcontroller or on the peripheral side. The peripherals need only be able to interpret an address configuration instruction sent by the microcontroller. The implementation of such an instruction is within the abilities of those skilled in the art based on the functional indications given hereabove.

Another advantage of the present invention is that it is adaptable on most peripheral devices. Indeed, most of the peripheral devices to be connected to a series bus comprise at least one output terminal usable according to the present invention.

Of course, the present invention is likely to have various alterations, modifications, and improvements which will occur to those skilled in the art. In particular, although the present invention has been more specifically described hereabove with a vocabulary referring to a hardware forming, it may be implemented indifferently with hardware of software means.

Further, the practical implementation of the present invention based on the functional indications given hereabove is within the abilities of those skilled in the art.

Finally, although the present invention has been described in relation with the sharing of an I2C bus, it more specifically applies to any series bus of at least one conductor posing the same problems of address selection between two peripherals of a same host device.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for sharing a series bus, connected to a first device and to two secondary devices, by a configuration within each secondary device of a different address, comprising, in a configuration phase, temporarily configuring an output terminal of each secondary device as an input terminal in a mode of reading of the voltage present on this terminal to select one address out of two within the secondary device, and delaying, by a first time period, a taking into account of the voltage present on the output terminal with respect to a start time of the configuration phase.

2. The method of claim 1, wherein a first default address is selected if, in the configuration phase, the voltage present on said terminal is lower than a given threshold, the second address being selected if said voltage becomes higher than said threshold during the configuration phase.

3. The method of claim 2, wherein the respective output terminals of the secondary devices are connected to a low or high voltage by a resistor of high value, according to the address that they must select.

4. The method of claim 2, wherein the configuration phase starts, in each secondary device, on receiving of an instruction sent with the first address by the first device.

5. The method of claim 1, applied to an I2C bus.

6. A circuit for configuring the address of a device connectable to a series bus, comprising means for temporarily configuring an output terminal of the device as an input terminal having its state compared with a threshold, and means for exploiting a result of this comparison to select one address out of two for the device, comprising at least one first time counter to delay, by a first time period, the taking into account of said comparison with respect to a start time of a configuration phase.

7. The circuit of claim 6, wherein the first counter triggers the end of the configuration phase at the end of twice the first time period.

8. The circuit of claim 6, wherein a second counter validates the result of said comparison if this result is in a same state for a second time period longer than half the first one.

9. The circuit of claim 6, wherein the duration of the configuration phase is shorter than the duration of transmission of a byte over the series bus.

10. The circuit of claim 6, wherein the configuration phase is triggered by the receiving of an instruction over the series bus.

11. The circuit of claim 6, wherein the series bus is an I2C bus.

12. A system for sharing a same series bus connecting a first device to two secondary devices, wherein each secondary device has an output terminal respectively connected to a low or to a high supply voltage by a resistor, and comprises the address configuration circuit of claim 6.

13. A method for configuring an address of a device, comprising:
    configuring an output terminal of the device to function as an input terminal in a configuration phase;
    sensing a state of the output terminal in the configuration phase; and
    selecting an address in response to the sensed state of the output terminal in the configuration phase, wherein selecting an address includes delaying, by a first time period, a taking into account of the state of the output terminal with respect to a start time of the configuration phase.

14. A method as defined in claim 13, wherein a first address is selected if a voltage on the output terminal during the configuration phase is lower than a threshold voltage and a second address is selected if the voltage on the output terminal during the configuration phase is higher than the threshold voltage.

15. A method as defined in claim 14, wherein the output terminal is connected to a low voltage or to a high voltage by a resistor, based on the address to be selected.

16. Apparatus for configuring an address of a device, comprising:
    a first circuit to configure an output terminal of the device to function as an input terminal in a configuration phase;
    a second circuit to sense a state of the output terminal in the configuration phase; and
    a third circuit to select an address in response to the sensed state of the output terminal in the configuration phase, wherein the second circuit comprises a comparator for comparing a voltage on the output terminal with a threshold voltage, and wherein the third circuit comprises a first counter to delay, by a first time period, the selection of an address with respect to a start of the configuration phase.

17. Apparatus as defined in claim 16, wherein the first counter terminates the configuration phase at the end of twice the first time period.

18. Apparatus as defined in claim 16, wherein the third circuit includes a second counter to validate a result of the comparison if the result is in one state for a second time period longer than half the first time period.

19. Apparatus as defined in claim 16, wherein the apparatus is connectable to a series bus and wherein the duration of the configuration phase is shorter than the duration of transmission of a byte over the series bus.

20. Apparatus as defined in claim 16, wherein the apparatus is connectable to a series bus and wherein the configuration phase is triggered by receiving an instruction over the series bus.

21. Apparatus as defined in claim 16, wherein the apparatus is connectable to an I2C bus.

* * * * *

UNITED STATES PATENT AND TRADEMARK OFFICE
CERTIFICATE OF CORRECTION

| | | |
|---|---|---|
| PATENT NO. | : 8,040,215 B2 | Page 1 of 1 |
| APPLICATION NO. | : 11/432773 | |
| DATED | : October 18, 2011 | |
| INVENTOR(S) | : Abdelouahid Zakriti | |

It is certified that error appears in the above-identified patent and that said Letters Patent is hereby corrected as shown below:

Col. 6, line 31, should read:
V7 starts increasing to reach the high level, for example, Signed and Sealed this
Twenty-second Day of November, 2011

David J. Kappos
*Director of the United States Patent and Trademark Office*